United States Patent
Ma

[11] Patent Number: 5,465,574
[45] Date of Patent: Nov. 14, 1995

[54] CATALYTIC CONVERTER

[75] Inventor: Thomas T. Ma, South Woodham Ferrers, United Kingdom

[73] Assignee: Ford Motor Company, Dearborn, Mich.

[21] Appl. No.: 211,731

[22] PCT Filed: Oct. 12, 1992

[86] PCT No.: PCT/GB92/01855

§ 371 Date: Apr. 11, 1994

§ 102(e) Date: Apr. 11, 1994

[87] PCT Pub. No.: WO93/07365

PCT Pub. Date: Apr. 15, 1993

[30] Foreign Application Priority Data

Oct. 12, 1992 [GB] United Kingdom ............. 9121597

[51] Int. Cl.$^6$ ........................................ F01N 3/28
[52] U.S. Cl. ................. 60/300; 60/284; 60/303; 422/174
[58] Field of Search .................... 60/303, 284, 300; 422/174

[56] References Cited

U.S. PATENT DOCUMENTS 3,854,288 12/1974 Heitland .................. 60/303
3,952,507 4/1976 Bonarski .................. 60/303

FOREIGN PATENT DOCUMENTS 131957 8/1982 Japan.

Primary Examiner—Douglas Hart
Attorney, Agent, or Firm—L. S. Melotik; R. L. May

[57] ABSTRACT

A catalytic converter comprises two catalytic matrices 10, 12, 14 mounted in a common housing and spaced from one another by an afterburner chamber 16. An igniter 22 is arranged in the afterburner chamber 16 near the first matrix 12 and a flame guard 18 is arranged upstream of and in close proximity to the igniter 22. The flame guard 18 comprises at least one elongate narrow strip spanning the combustion chamber which acts to spread the base of the flame across the width of the chamber 16 so as to enable the flame to spread in a shorter distance across the exhaust gases before reaching the second matrix 14.

6 Claims, 2 Drawing Sheets 5,465,574

CATALYTIC CONVERTER

FIELD OF THE INVENTION

The present invention relates to a rapid light-off catalytic converter.

BACKGROUND OF THE INVENTION

It is known to incorporate an afterburner in the exhaust system of an internal combustion engine in order to heat a catalytic converter so as to reduce the time it takes to reach its light-off temperature. The flame in the afterburner heats up the front face of the matrix in the converter but the heat is localised to this area for some time. As this portion of the matrix is subjected to the most severe conditions, its catalyst is the most prone to contamination and therefore when the catalytic converter ages, raising the temperature of its front face does not have the desired effect of reducing the time taken for it to become effective.

SUMMARY OF THE INVENTION

According to the present invention, there is provided a catalytic converter for an internal combustion engine exhaust system, having an outer housing, two or more matrices each defining passages for the exhaust gases and carrying particles of a catalyst, the matrices being arranged in series with one another in the direction of flow of engine exhaust gases through the converter, a chamber disposed between the two matrices, and an igniter arranged within the chamber to ignite the gaseous mixture that comprises only the gases that have passed through the first of the two matrices, the mixture being caused to burn as a flame within the chamber so as to form an afterburner for heating the second of the matrices and thereby reducing the time taken for the second of the two matrices to reach its light-off temperature.

It is well known to form a catalytic converter of two separate matrices, or bricks as they are sometimes called. These bricks have the form of a ceramic honeycomb which is coated with a washcoat. Particles of a catalyst, usually platinum, are embedded in the surface of the matrix, the design of the matrix being intended to maximise the surface area over which the catalytic reaction takes place.

By placing the afterburner between two bricks of a catalytic converter, the invention offers several advantages. First, the afterburner heats the second brick instead of the first and therefore takes advantage of the fact that the catalyst in the second brick is less prone to contamination.

In an exhaust afterburner, a flame is ignited which requires control in the same way as any other flame. In the absence of proper control, the flame can burn erratically or it can be extinguished by the exhaust gases passing over it. There is also a risk of the flame blowing back from the afterburner chamber towards the combustion chambers of tile engine.

In the present invention, however, the presence of the first brick upstream of the afterburner chamber helps to stabilise the flame. The brick diffuses and reduces the speed of the stream of exhaust gases from the engine to prevent the flame from being blown out. The first brick also acts as a flame holder to stabilise combustion within the flame and prevent it from flaring.

In a preferred embodiment of the invention, a flame guard is arranged upstream of and in close proximity to the igniter, the flame guard comprising at least one elongate narrow strip spanning the width if the chamber between the bricks.

Preferably, the strip is in the form of a V-shaped channel with the vertex of the V pointing upstream.

Advantageously, the flame guard is formed of a plurality of strips which intersect one another.

The flame guard acts as a shield against the flow of gases through the afterburner creating in its wake regions of low velocity but high turbulence which are easily ignitable and which are not blown out by the main flow. The flame initiated at the igniter easily spreads across the regions behind the flame guard and passes from one strip to another at any intersection between flame guard strips. Thus, when the main gas stream burns as a flame, the base of the flame is not localised to the igniter but it stretches instead over the entire length of the strips of the flame guard.

Because the flame in the main gas stream has a wide and distributed base, its tip does not need to spread laterally very far to cover the entire cross section of the afterburner.

The invention also offers the advantage of compactness in that a combined catalytic converter and afterburner need not be much larger than a conventional converter alone. This not only makes packaging simpler but reduces the precautions that need to be taken against fire. It should be born in mind that both the converter and the afterburner would at different times reach elevated temperatures in conventional system and both would need to be shielded. If the two are combined then no extra precautions need to be taken on account of the presence of the afterburner between the bricks of the converter.

BRIEF DESCRIPTION OF THE DRAWING

The invention will now be described further, by way of example, with reference to the accompanying drawing in which.

DETAILED DESCRIPTION OF THE INVENTION

Figure 1:
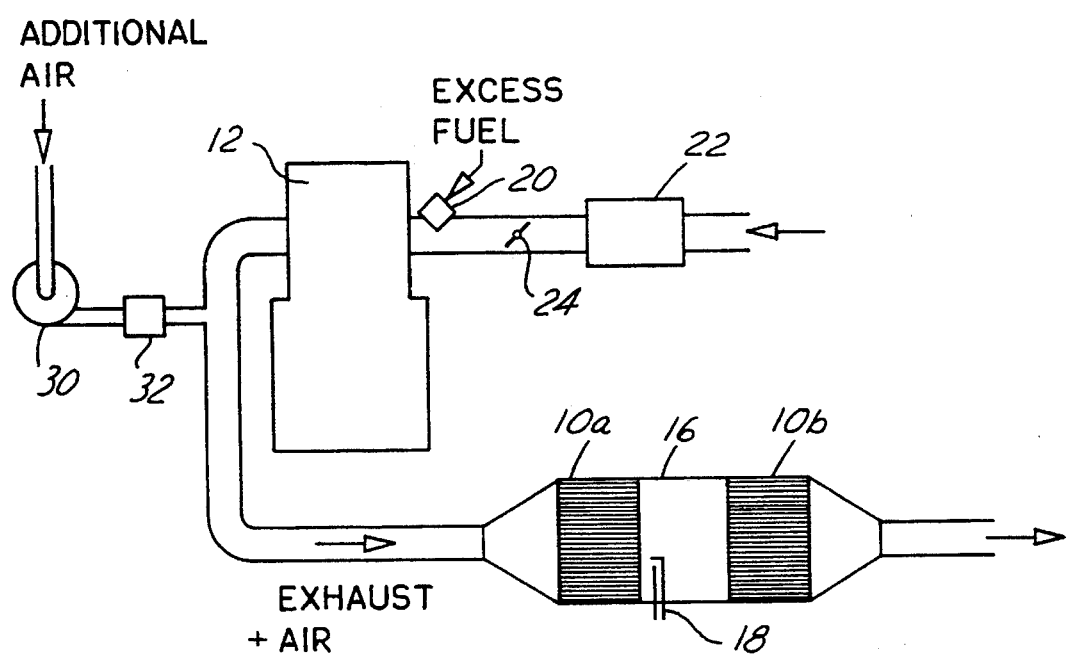
FIG. 1 shows schematically an engine having a combined catalytic converter and afterburner of the invention.

In FIG. 1, an engine 12 is supplied with air by an inlet manifold which incorporates an air metering unit 22, a butterfly throttle 24 and a fuel injector 20. The exhaust pipe 14 from the engine leads to atmosphere by way of a combined catalytic converter and afterburner housed in the same unit and comprising two bricks 10a and 10b separated from one another by an afterburner chamber 16 in which there is arranged a spark igniter 18.

Air can be added to the exhaust gases from the engine from a branch of the exhaust pipe containing an air pump 30 and a control valve 32.

The afterburner 16 is brought into operation only when the catalyst is below its light-off temperature. To do this, the engine is operated with a rich mixture to ensure that the exhaust gases contain hydrogen and additional air is pumped in by the pump 30 to ensure that the mixture in the afterburner chamber 16 is ignitable. If the catalyst is completely cold, a combustion charge having a fuel to air equivalence ratio of more than 1.7 may be required for this purpose but at higher temperature, if a cool flame reaction is already taking place in the gases, a weaker mixture strength suffices. At the same time, the additional air is also regulated to ensure that the mixture in the afterburner chamber 16 is stoichiometric.

Having provided the afterburner chamber 16 with an ignitable and combustible mixture, the next step required is to create a series of sparks in the chamber by means of the spark igniter 18 for setting the mixture alight and creating a flame for heating the second brick 10b. Once the brick 10b reaches its light-off temperature, the afterburning can be discontinued. The effect of the afterburner is not only to heat the second brick 10b of the catalytic converter but to reduce undesirable emissions prior to light-off of the converter.

If desired a sensor may be placed in the afterburner chamber to detect the presence of a flame of the radiation emitted from the front face of the second brick 10b of the catalytic converter. Such a sensor may be used to control the mixture strength and quantity of additional air in a control loop for the afterburner.

The embodiment of the invention described in FIG. 1 offers the advantage of compactness and reduced cost. The flame of the afterburner burns more steadily because the first brick 10a acts as a diffuser and flame holder. The risk of the flame blowing back into the engine is also reduced. Also as compared with prior art proposals to heat the front face of the first brick using a separate afterburner, the invention offers the advantage that the region of the converter first brought into operation by the afterburner is one which is protected by the first brick and is therefore less prone to contamination.

Figure 2:
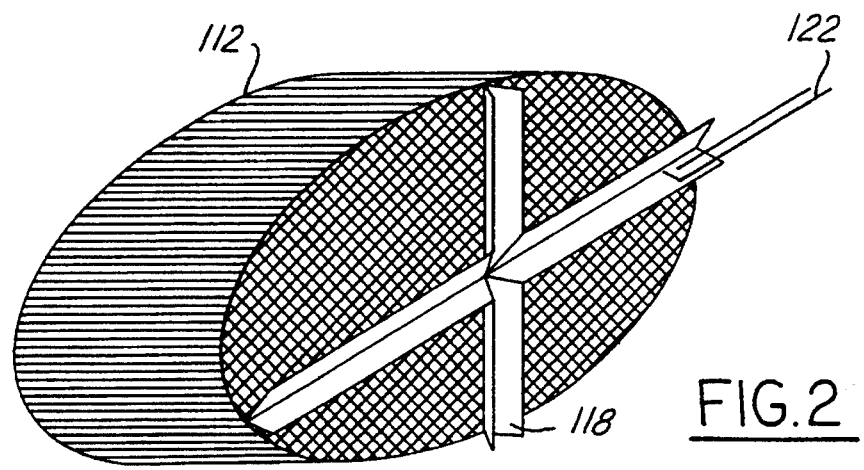
FIG. 2 is a isometric view of part of the interior of a catalytic converter.
Figure 3:
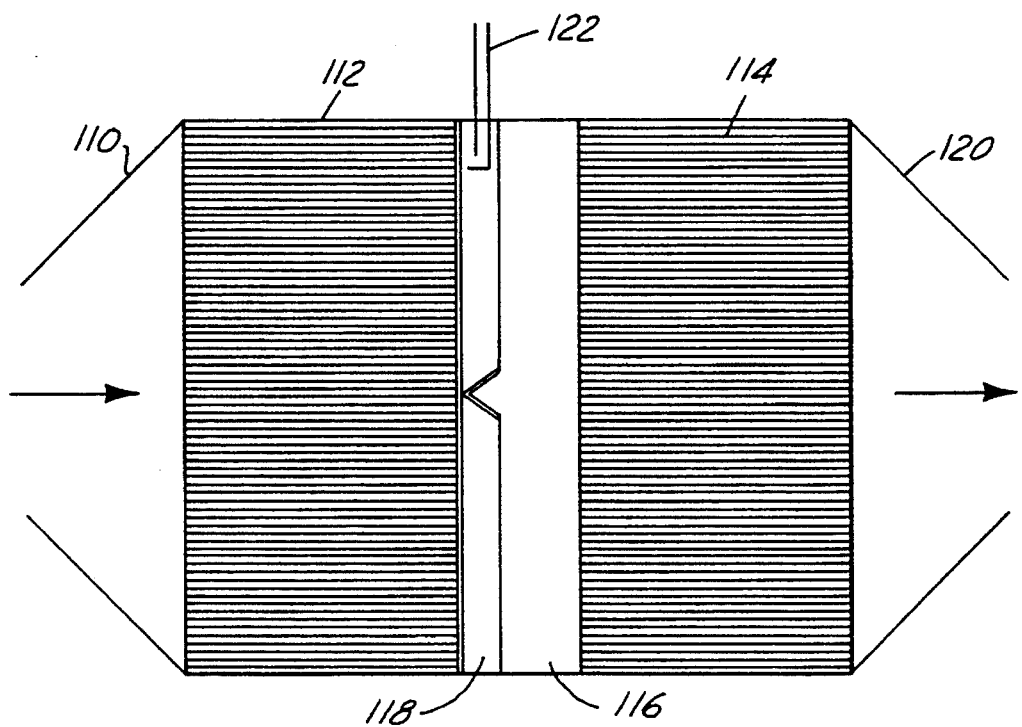
FIG. 3 is a section through a catalytic converter of a preferred embodiment of the invention.

Referring now to FIG. 3, in which a catalytic converter of a preferred embodiment of the invention is shown in more detail, the housing of the catalytic converter has an intake section 110 and an exit section 120. Between these two sections, the housing contains two matrix bricks 112 and 114 separated from one another by an afterburner combustion chamber 116 in which there is arranged an igniter 122. In the present embodiment, a flame guard 118 is arranged upstream of, and in close proximity to, the igniter 122. The flame guard 118, which is better shown in FIG. 2, comprises four V-shaped strips radiating from the centre of the catalytic converter, with the vertices of the V-sections pointing upstream. The outer ends of the strips are secured to the housing of the catalytic converter and if desired the igniter 122 may consist of a single insulated electrode arcing across to the flame guard 118.

In the absence of a flame guard 18, when a spark is created at the igniter 22 it ignites the mixture and a flame is started at the igniter 22. It is essential however that the flame spread over the entire area of the front face of the brick 14 otherwise unignited gases will enter the brick, and once inside the brick, the design of the passages in the brick prevents the flame from spreading within the matrix brick 114.

To give the flame the opportunity to spread over the cross section of the converter one must either make the afterburner chamber 116 very long or initiate several flames at the same time, distributed over the area of the chamber 116, for example by using several igniters.

The provision of a flame guard 118 has the same effect as positioning separate igniters along the length of each V-shaped strip. As the exhaust gas and additional air mixture is diverted around the strips it forms a wake in which the mean gas velocity is very low but in which vortices are set up by the gases pouring over the edges of the strips. These conditions are ideal for stable ignition and when the single igniter 122 is fired it will light a flame, the base of which will instantly spread to cover the area of the flame guard. If the strips are arranged in the form of a star or a regular matrix then the flame will spread at each intersection from one strip to the next, ensuring that the flame spreads over the surface of the brick 112. If too many guard strips are provided, they risk obstructing the gas flow and in practice a compromise must be reached between the length of the afterburner chamber 116 and the obstruction presented to the exhaust gas flow by the flame guard.

Because the combustion flame cannot spread laterally through the exhaust gases after they have entered the matrix brick, it is important to ensure that the flame covers the entire front face of the brick. This does not however mean that the combustion of the exhaust gas and additional air mixture must be complete at the time the gases reach the front face of the brick as combustion can continue after ignition within the passages of the catalytic matrix brick.

Shortening the afterburner chamber 116 to achieve such combustion within the matrix is desirable only from the point of view of compactness but because it offers two further advantages. If combustion is complete before the gases reach the matrix, the temperature of the gases may be in excess of the temperature that the catalyst can safely withstand. By allowing the combustion to continue within the passages of the matrix brick, not only is the initial temperature of the gases lowered to safe values but the further heat emitted during the continued combustion is spread over some distance within the matrix brick and is used to light-off the converter more uniformly.

The invention can also be applied to system having more than two catalytic matrix bricks in series with one another and such a construction is advantageous in that the chamber between the second and third bricks can promote lateral spreading of the flame, if for any reason the flame does not succeed in covering the entire front face of the second matrix brick.

I claim:

1. A catalytic converter for an internal combustion engine exhaust system, having an outer housing (110,120), two or more matrices (112,114) each defining passages for the exhaust gases and carrying particles of a catalyst, the matrices (112,114) being arranged in series with one another in the direction of flow of engine exhaust gases through the converter, a chamber (116) disposed between the two matrices, and an igniter (122) arranged within the chamber to ignite the gaseous mixture that comprises only the gasses that have passed through the first of the two matrices, the mixture being causes to burn as a flame within the chamber so as to form an afterburner for heating the second of the matrices and thereby reducing the time taken for the second of the two matrices to reach its light-off temperature characterized in that a flame guard (118) is arranged upstream of and in close proximity to the igniter (122), the flame guard comprising at least one elongate narrow strip spanning the afterburner chamber, wherein the strip is in the form of a V-shaped channel, the vertex of the V pointing upstream.

2. A catalytic converter for an internal combustion engine exhaust system, having an outer housing (110,120), two or more matrices (112,114) each defining passages for the exhaust gases and carrying particles of a catalyst, the matrices (112,114) being arranged in series with one another in the direction of flow of engine exhaust gases through the converter, a chamber (116) disposed between the two matrices, and an igniter (122) arranged within the chamber to ignite the gaseous mixture that comprises only the gasses that have passed through the first of the two matrices, the mixture being caused to burn as a flame within the chamber so as to form an afterburner for heating the second of the matrices and thereby reducing the time taken for the second of the two matrices to reach its light-off temperature, characterized in that a flame guard (118) is arranged upstream of and in close proximity to the igniter (122), the flame guard comprising at least one elongate narrow strip spanning the afterburner chamber, wherein the flame guard is formed of a plurality of strips which intersect one another.

3. A catalytic converter for an internal combustion engine exhaust system, having an outer housing (110,120), two or more matrices (112,114) each defining passages for the exhaust gases and carrying particles of a catalyst, the matrices (112,114) being arranged in series with one another in the direction of flow of engine exhaust gases through the converter, a chamber (116) disposed between the two matrices, and an igniter (122) arranged within the chamber to ignite the gaseous mixture that comprises only the gasses that have passed through the first of the two matrices, the mixture being causes to burn as a flame within the chamber so as to form an afterburner for heating the second of the matrices and thereby reducing the time taken for the second of the two matrices to reach its light-off temperature, characterized in that a flame guard (118) is arranged upstream of and in close proximity to the igniter (122), the flame guard comprising at least one elongate narrow strip spanning the afterburner chamber, wherein the length of the afterburner chamber is such that the ignited regions of the exhaust extend over the entire front face of the second catalytic matrix brick but combustion of the gases in only completed within the internal passages of the second matrix brick.

4. A catalytic converter as claimed in claim 1, wherein the flame guard is formed of a plurality of strips which intersect one another.

5. A catalytic converter as claimed in claim 1, wherein the length of the afterburner chamber is such that the ignited regions of the exhaust gases extend over the entire front face of the second catalytic matrix brick but combustion of the gases is only completed within the internal passages of the second matrix brick.

6. A catalytic converter as claimed in claim 2, wherein the length of the afterburner chamber is such that the ignited regions of the exhaust gases extend over the entire front face of the second catalytic matrix brick but combustion of the gases is only completed within the internal passages of the second matrix brick.

* * * * *